Oct. 10, 1961   J. F. MENKE   3,004,162
INFRA-RED RAY DETECTING APPARATUS
Filed Oct. 21, 1957   2 Sheets-Sheet 1
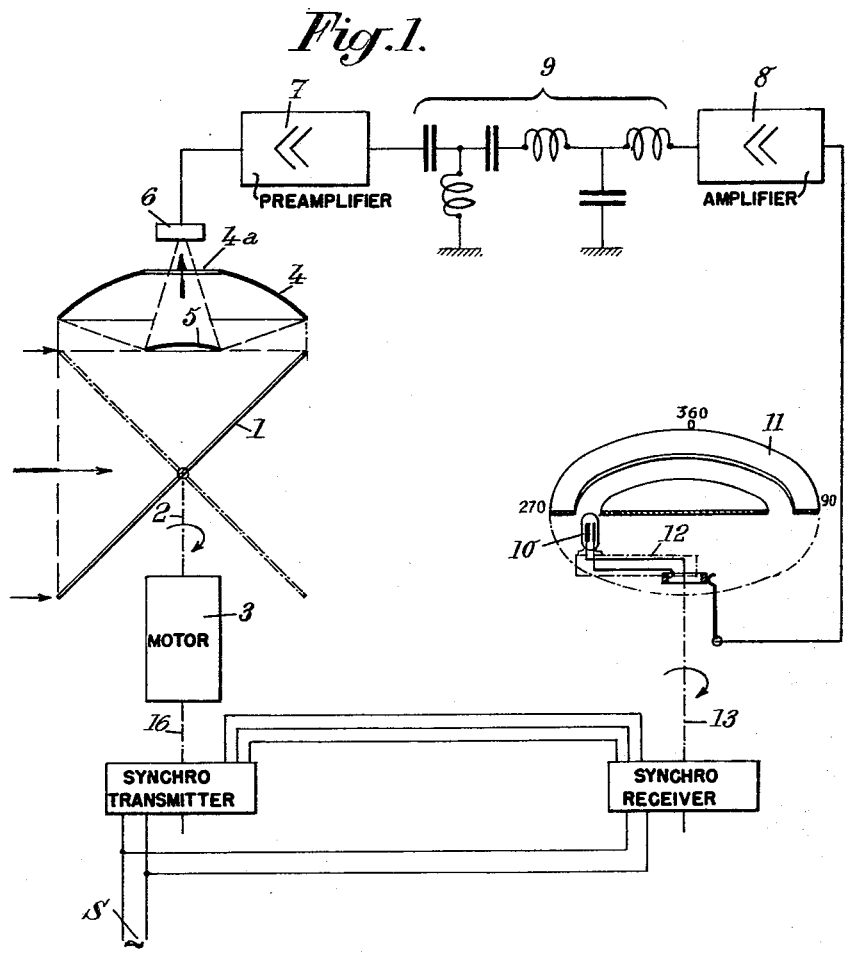
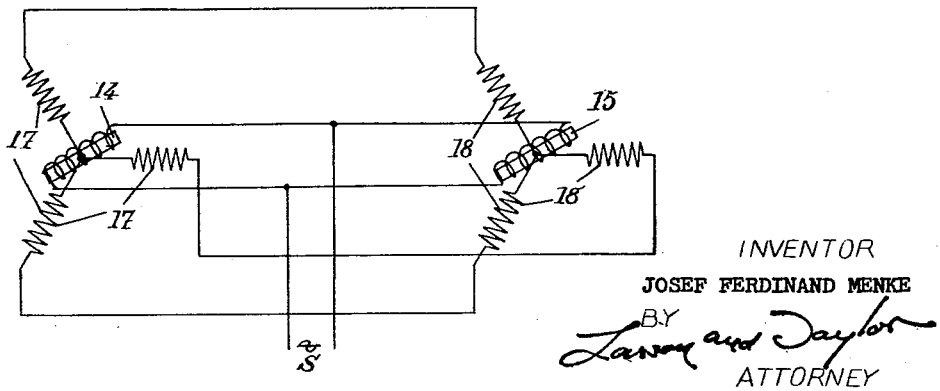
INVENTOR
JOSEF FERDINAND MENKE
BY
ATTORNEY

INVENTOR
JOSEF FERDINAND MENKE
ATTORNEY

United States Patent Office 3,004,162
Patented Oct. 10, 1961

3,004,162
INFRA-RED RAY DETECTING APPARATUS
Josef Ferdinand Menke, Zurich, Switzerland, assignor to Brinro Limited, Mohamed V, Tangiers, a society of Tangiers
Filed Oct. 21, 1957, Ser. No. 691,456
Claims priority, application Luxembourg Oct. 25, 1956
6 Claims. (Cl. 250—83.3)

The present invention relates to apparatus for detecting infra-red rays in a plane, and in particular in a horizontal plane, and for indicating the direction from which these rays are coming. Such apparatus include, on the one hand a receiver rotatable about an axis at least substantially perpendicular to said plane, and on the other hand indicator means including an indicator element rotatable in synchronism with the receiver in front of a fixed dial. Said indicator member gives a signal when infra-red rays are being transmitted to the receiver, so that the direction from which said rays are coming is indicated by the position occupied at this time by said indicator member with respect to said dial.

The present invention is more particularly but not exclusively concerned with apparatus of the above indicated type used for navigation purposes and in particular for navigation in the mouths of rivers and at the entrance of harbours.

The object of the present invention is to provide an apparatus of the above indicated type which is better adapted to meet the requirements of practice and in particular which is highly sensitive without however being perturbed by parasitic rays such as may result from meteorological phenomenons.

The essential feature of the present invention consists in inserting between the receiver and indicator means a high-pass filter the cut-off frequency of which has a predetermined value to prevent transmission to said indicator means of signals of a duration exceeding a given value.

Other features of this invention will become apparent in the course of the following detailed description of some specific embodiments thereof with reference to the accompanying drawings, given merely by way of example and in which:

FIG. 1 diagrammatically shows an apparatus made according to the present invention.

FIG. 2 shows the lay-out of the rotary field electric system serving to synchronize the movements of the receiver scanning means and of the indicator means.

Figure 3:
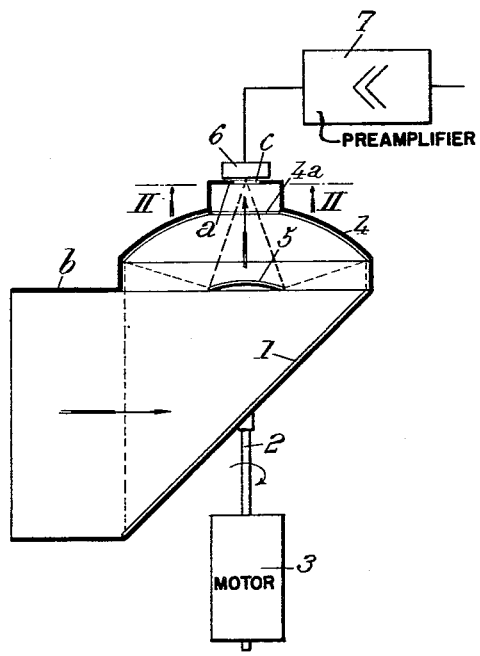
FIG. 3 is a partial view showing a modification.

The receiver system of the apparatus, as shown by FIG. 1, includes a flat mirror 1 rotatable about a vertical axis 2 and placed at an angle of 45° to said axis, this mirror being rotated by a motor 3. Thus, in the course of a rotation of 360°, the mirror scans the whole horizon.

The fractional images received at any time by mirror 1 are reflected onto a concave spherical mirror 4, shown in sectional view, which concentrates the rays it receives and projects them onto a convex spherical mirror 5 which is also shown in sectional view. This mirror 5 concentrates the rays it has received, through a central opening 4a provided in mirror 4, onto a photo-electric cell 6 sensitive to infra-red rays and located in the image plane of the optical system. The relatively great focal distance of this optical system is determined in accordance with the radii of curvature of mirrors 4 and 5. Thus, fractional images of the horizon are successively received by cell 6. As soon as one of these images includes a source of infrared rays, cell 6 is energized and sends a current impulse which is transmitted, through an amplifier system, to the indicator means of the apparatus.

The amplifier system includes for instance a preamplifier 7 and a final amplifier 8.

According to the present invention, between cell 6 and the indicator means, and preferably between preamplifier 7 and amplifier 8, there is provided a filter 9 of the high-pass type, that is to say a filter which passes only signals the duration of which is smaller than a predetermined value. If for instance the longer signal impulse to be passed through the amplifier toward the indicator means corresponds to a scanning angle (that is to say an angle of rotation of mirror 1) of 1°, and if mirror 1 turns at the rate of 10 revolutions per second, the high-pass filter should be given a cut-off frequency such that it passes only signals of a duration shorter than 1/3600 second (practically 1/3000 second). As parasitic sources of infra-red rays, such for instance as the setting sun or clouds reflecting such sun rays, correspond to a scanning angle much higher than 1°, the signals corresponding to the reception of these rays will be prevented by filter 9 from passing to the indicator means.

The signals which pass through the amplifier are transmitted to the indicator means. The essential element of said means is constituted by a member such as a discharge tube 10 which produces a luminous signal every time a signal is transmitted thereto. This tube is carried by a support which turns in synchronism with mirror 1 and the direction from which the infra-red rays are received is indicated by the position of said rotating support with respect to a concentric dial 11 one half of which is shown on FIG. 1. For instance, tube 10 is carried by a rotating arm 12 fixed on a shaft 13.

In order to achieve synchronism (i.e. the same number of revolutions per minute and the angular position at any time) between rotating mirror 1 and the arm which carries tube 10, I preferably make use, according to the present invention, of a rotary field generating system. This system includes, as shown by FIG. 2, two electromagnets 14 and 15 one of which, 14, is fixed to the shaft 16 of motor 3 and the other of which, 15, is fixed to the shaft 13 of the indicator means. These two electromagnets are energized by the same source of alternating current 8 the frequency of which is for instance 500 cycles per second. Each of these electro-magnets cooperates with a three-phase winding 17 or 18, the two three-phase windings being mounted in star arrangement. I thus obtain a rotation of tube 16 constantly in phase with that of mirror 1.

This apparatus works as follows. If at any point on the horizon, there is a source of infra-red rays, cell 6 creates an impulse every time the scanning mirror 1 is directed toward said source and these impulses, after amplification in amplifier means 7, 8, 9, are transmitted to discharge tube 10 and cause it to give a luminous signal at this time. The direction from which the infra-red rays are coming is indicated by the position of arm 12, which carries tube 10, with respect to dial 11. Owing to the provision of high-pass filter 9, tube 10 is operated only for signals the duration of which is below a given value, corresponding for instance to a scanning angle of at most 1°.

If the apparatus above described is a navigation apparatus, care should be taken to eliminate the action of the movements of the ship on which it is mounted. Therefore, the optical portion of the apparatus must be constantly stabilized so that the axis of rotation of mirror 1 remains constantly vertical. For this purpose I may use gyroscopes, for instance by providing at a suitable point of the ship an artificial horizon. The gyroscopes keep their position in space so that the elements of their gimbal mounting, which are connected to the ship in a conventional fashion make fixed angles with the gyroscopic axes during the movements of the ship. The angular displacements are for instance transmitted to a system creating a rotary field (such as a system being provided for each of the horizontal directions at right angles to each other).

The armature displacements created in the rotary field generator by the angular displacements of the ship with respect to the vertical direction are transmitted to a double rotary field receiver system disposed in identical fashion, which controls a servo-mechanism itself adapted to displace a platform on which is mounted at least the optical portion of the navigation apparatus in such manner as to compensate for the movements of the ship and to keep the axis of rotation of the optical system constantly vertical.

Furthermore, the optical system or the infra-red cell or both of them should be arranged in such manner that the height of the field portion which is constantly transmitted by the mirror is greater than the width of this field portion. For instance, the height may correspond to an angle of 5° whereas the width should range from 0.5. to 1°. One way of obtaining this result is to give cell 6 a suitable elongated shape (as shown by FIG. 1). Of course, in this case, cell 6 must rotate about the vertical axis of rotation of mirror 1 and at the same speed.

Figure 4:
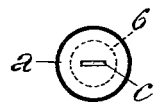
FIG. 4 is a plan view corresponding to FIG. 3.

In order to avoid this necessity of rotating cell 6 together with mirror 1, I may (as shown by FIGS. 3–4) leave cell 6 stationary, and interpose, between it and mirror 5, a shutter $a$ provided with a slot $c$ for the passage of the beam from mirror 5 toward said cell 6, said slot $c$ having the desired elongated shape, i.e. a height considerably greater than its width (as visible on FIG. 4), this shutter being made to rotate about the axis of rotation of mirror 1 (axis of shaft 2) and at the same speed as said mirror. Of course, the photosensitive layer of cell 6 is of such an area that, in all positions of said shutter $a$, the whole of the beam allowed to pass through slot $c$ reaches the photosensitive layer of cell 6. For instance, as shown by FIG. 4, this layer is of circular shape and of a diameter slightly greater than the height (length) of slot $c$.

In the construction illustrated by FIG. 3, shutter $a$ is rigid with mirror 1. For this purpose, in this particular embodiment of the invention, shutter $a$ is rigid with mirror 4, which is itself rigid with mirror 1. Preferably, convex mirror 4 is also rigid with the revolving unit 2–1–4–$a$.

Obviously, the slotted shutter $a$ need not be connected to the revolving mirror 1 through the optical system 4, 5, but can be coupled to the mirror in any suitable way, or else, can be made to revolve synchronously with the latter, whereas the optical system 4, 5 itself need not participate in the revolution.

The apparatus according to the present invention may be used for different purposes. When it serves to scan the horizon to detect infra-red ray sources, knowledge of the mutual location of such sources may be used for navigation purposes. But the device may also be used to receive any information. It may for instance serve to determine if a ship which is transmitting infra-red rays is wishing to exchange signals by means of infra-red rays (i.e. by means of optical telegraphic apparatus making use of infra-red rays).

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

This application is a continuation in part of my application Ser. No. 516,570 filed June 20, 1955, now abandoned.

What I claim is:

1. An infra-red ray detecting apparatus which comprises, in combination, a photo-electric receiver element, optical scanning means rotatable about an axis for temporarily and recurrently directing onto said element infra-red rays from any point of a space limited by a surface of revolution about said axis, rotatable indicator means responsive to electrical signals, means for constantly and continuously revolving said scanning means and said indicator means in synchronism with each other at a given speed, and electric means for connecting the output of said photo-electric means with said indicator means, said electric means including a high-pass filter the cut-off frequency of which has a predetermined value chosen as a function of said speed to prevent transmission to said indicator means of signals from infra-red ray sources of such dimensions that the amplitude of scanning thereof by said optical means exceeds a given angle.

2. An infra-red ray detecting apparatus which comprises, in combination, a flat mirror rotatable about a vertical axis, said mirror being oblique to said axis, a concave mirror having its axis substantially in line with said first mentioned axis, the concavity of said concave mirror being turned toward said flat mirror, a convex mirror interposed between said flat mirror and said concave mirror, said convex mirror being of smaller diameter than said concave mirror and having its axis in line with said first mentioned axis, the convex reflecting face of said convex mirror being turned toward said concave mirror, said concave mirror being provided with a central opening, a photo-electric cell located opposite said opening on the other side of said concave mirror from said convex mirror, the photo-sensitive layer of said photo-electric cell being located in the image plane of the optical system constituted by said convex and concave mirrors, rotatable indicator means responsive to electrical signals, means for constantly and continuously revolving said flat mirror and said indicator means in synchronism and in phase with each other at a given speed, and electric means for connecting the output of said photo-electric cell with said indicator means, said electric means including an amplifier and a high-pass filter the cut-off frequency of which has a predetermined value chosen as a function of said speed to prevent transmission to said indicator means of signals from infra-red ray sources of such dimensions that the amplitude of scanning thereof by said optical means exceeds a given angle.

3. An apparatus according to claim 2 in which said photo-electric cell is rotatable together with said flat mirror and the photo-sensitive layer of said photo-electric cell is of elongated shape, its longer dimension being located in the plane at right angles to said flat mirror which passes through said first mentioned axis.

4. An apparatus according to claim 2 in which said photo-electric cell is stationary, further including a shutter interposed between said convex mirror and said photo-electric cell, said shutter being provided with a slot of elongated shape to limit the beam directed from said convex mirror toward said cell, and means for revolving said shutter about said first mentioned axis at the same speed as said flat mirror, the longer dimension of said slot being located in the plane at right angles to said flat mirror which passes through said first mentioned axis.

5. An apparatus according to claim 2 in which said photo-electric cell is stationary, further including a shutter interposed between said convex mirror and said photo-electric cell, said shutter being provided with a slot of elongated shape to limit the beam directed from said convex mirror toward said cell, said shutter being rigid with said flat mirror, the longer dimension of said slot being located in the plane at right angles to said flat mirror which passes through said first mentioned axis.

6. An apparatus according to claim 1 in which said means for revolving said scanning means and said indicator means in synchronism consist of electrical rotary field means.

References Cited in the file of this patent

UNITED STATES PATENTS

| | | |
|---|---|---|
| 2,032,588 | Miller | Mar. 3, 1936 |
| 2,075,094 | Chubb | Mar. 30, 1937 |
| 2,077,398 | Clark | Apr. 20, 1937 |
| 2,410,317 | Tolson | Oct. 29, 1946 |
| 2,431,625 | Tolson | Nov. 25, 1947 |
| 2,454,841 | Sackville | Nov. 30, 1948 |
| 2,491,192 | Martin | Dec. 13, 1949 |
| 2,742,578 | Nicolson | Apr. 17, 1956 |
| 1,761,072 | Wormser | Aug. 28, 1956 |
| 2,779,924 | Chatellier | Jan. 29, 1957 |
| 2,844,033 | Tandler et al. | July 28, 1958 |